(12) United States Patent
Polegato Moretti

(10) Patent No.: US 8,745,892 B2
(45) Date of Patent: Jun. 10, 2014

(54) WATERPROOF AND BREATHABLE SOLE FOR SHOES

(75) Inventor: Mario Polegato Moretti, Crocetta Del Montello (IT)

(73) Assignee: Geox S.p.A., Montebelluna (IT)

( * ) Notice: Subject to any disclaimer, the term of this patent is extended or adjusted under 35 U.S.C. 154(b) by 1202 days.

(21) Appl. No.: 11/658,885

(22) PCT Filed: Jul. 25, 2005

(86) PCT No.: PCT/EP2005/008064
§ 371 (c)(1),
(2), (4) Date: Jan. 30, 2007

(87) PCT Pub. No.: WO2006/010578
PCT Pub. Date: Feb. 2, 2006

(65) Prior Publication Data
US 2009/0211119 A1    Aug. 27, 2009

(30) Foreign Application Priority Data
Jul. 30, 2004   (IT) .............................. PD2004A0208

(51) Int. Cl.
A43B 7/06 (2006.01)
A43B 13/00 (2006.01)
A43B 13/22 (2006.01)
A43B 13/08 (2006.01)
A43B 9/02 (2006.01)

(52) U.S. Cl.
USPC ............. 36/3 B; 36/3 R; 36/103; 36/32 R; 36/14; 36/19.5

(58) Field of Classification Search
USPC ..... 36/103, 3 R, 3 B, 3 A, 12, 14, 19.5, 25 R, 36/30 R, 30 A, 31, 32 R, 147
See application file for complete search history.

(56) References Cited

U.S. PATENT DOCUMENTS 2,432,533 A * 12/1947 Margolin .................... 36/3 B
3,383,782 A *  5/1968 McGinnity .................. 36/3 A
(Continued)

FOREIGN PATENT DOCUMENTS

GB   756453   9/1956
GB   1144149  3/1969
(Continued)

OTHER PUBLICATIONS

U.S. Appl. No. 13/091,355, filed Apr. 21, 2011, Polegato Moretti, et al.

(Continued)

*Primary Examiner* — Khoa Huynh
*Assistant Examiner* — Timothy K Trieu
(74) *Attorney, Agent, or Firm* — Oblon, Spivak, McClelland, Maier & Neustadt, L.L.P.

(57) ABSTRACT

A waterproof and breathable sole for shoes, including a lower layer, including at least one large through hole. Above the lower layer, a mesh is provided, arranged to overlap at least the large through hole. A membrane made of a material that is impermeable to water and permeable to water vapor is associated in an upward region with respect to the mesh at least at the large hole. The membrane is joined hermetically at least perimetrically to at least one component of the sole so as to avoid liquid rise through the perimeter of the large hole. A perforated upper layer is arranged above the membrane. The lower layer is overmolded on the mesh and partially incorporates the mesh.

17 Claims, 4 Drawing Sheets

(56) References Cited

U.S. PATENT DOCUMENTS

| | | | | |
|---|---|---|---|---|
| 4,063,371 A * | 12/1977 | Batra | ............... | 36/3 B |
| 4,925,724 A * | 5/1990 | Ogden | ............... | 428/137 |
| 5,280,680 A * | 1/1994 | Burke et al. | ............... | 36/28 |
| 5,400,526 A * | 3/1995 | Sessa | ............... | 36/3 B |
| 5,746,012 A * | 5/1998 | Caletti et al. | ............... | 36/3 B |
| 5,826,349 A * | 10/1998 | Goss | ............... | 36/3 R |
| 5,836,094 A * | 11/1998 | Figel | ............... | 36/131 |
| 5,845,418 A * | 12/1998 | Chi | ............... | 36/3 B |
| 5,893,219 A * | 4/1999 | Smith et al. | ............... | 36/3 B |
| 5,983,524 A | 11/1999 | Polegato | | |
| 6,065,229 A * | 5/2000 | Wahrheit | ............... | 36/25 R |
| 6,151,806 A | 11/2000 | Morris et al. | | |
| 6,195,918 B1 | 3/2001 | Kelley et al. | | |
| 6,312,782 B1 * | 11/2001 | Goldberg et al. | ............... | 428/67 |
| 6,389,711 B1 | 5/2002 | Polegato | | |
| 6,408,541 B1 * | 6/2002 | Moretti | ............... | 36/12 |
| 6,470,600 B1 | 10/2002 | Louie | | |
| 6,508,015 B1 * | 1/2003 | Rauch | ............... | 36/3 B |
| 6,604,302 B2 * | 8/2003 | Polegato Moretti | ............... | 36/55 |
| 6,615,512 B2 * | 9/2003 | Sink | ............... | 36/127 |
| 6,637,131 B2 * | 10/2003 | Lee | ............... | 36/17 R |
| D483,554 S * | 12/2003 | Burg et al. | ............... | D2/952 |
| D485,426 S * | 1/2004 | Di Girolamo | ............... | D2/961 |
| 6,813,847 B2 * | 11/2004 | Workman | ............... | 36/15 |
| 6,874,252 B2 * | 4/2005 | Nakano | ............... | 36/8.1 |
| 6,904,705 B2 * | 6/2005 | Polegato Moretti | ............... | 36/11 |
| 7,487,602 B2 * | 2/2009 | Berger et al. | ............... | 36/3 B |
| D595,942 S * | 7/2009 | White et al. | ............... | D2/961 |
| 7,707,748 B2 * | 5/2010 | Campbell | ............... | 36/102 |
| 8,127,465 B2 * | 3/2012 | Byrne et al. | ............... | 36/3 R |
| 2002/0157278 A1 * | 10/2002 | Moretti | ............... | 36/3 R |
| 2004/0035022 A1 | 2/2004 | Polegato Moretti | | |
| 2004/0154189 A1 * | 8/2004 | Wang | ............... | 36/28 |
| 2006/0236562 A1 * | 10/2006 | Wang | ............... | 36/29 |
| 2012/0151805 A1 * | 6/2012 | Polegato Moretti | ............... | 36/25 R |

FOREIGN PATENT DOCUMENTS

| | | | | |
|---|---|---|---|---|
| WO | 2004/004505 | | 1/2004 | |
| WO | 2004/028284 | | 4/2004 | |
| WO | WO 2004028284 A1 * | | 4/2004 | ............... A43B 7/12 |

OTHER PUBLICATIONS

Office Action issued Sep. 30, 2013 in Argentinian Patent Application No. P050103043 (with English language translation).

* cited by examiner

WATERPROOF AND BREATHABLE SOLE FOR SHOES

TECHNICAL FIELD

The present invention relates to a waterproof and breathable sole for shoes, particularly but not exclusively useful in sports shoes.

The present invention also relates to a shoe provided with said sole.

BACKGROUND ART

Waterproof and breathable soles made of plastics for shoes have been known for many years.

A sole of this type is disclosed for example in U.S. Pat. No. 5,983,524 and EP 0858270 by the same Applicant.

Said sole is provided with a mid-sole that has a membrane made of a material that is impermeable to water and permeable to water vapor and is associated with a lower protective layer made of a material that is resistant to hydrolysis, water-repellent, breathable and/or perforated.

A tread made of perforated elastomer is joined hermetically and perimetrically to the mid-sole.

Evolutions of this waterproof and breathable sole are disclosed in many prior patents by the same Applicant.

Known evolutions include a waterproof and breathable sole disclosed in U.S. Ser. No. 10/529,187 and EPA 03769286.0.

The type of sole described in these last documents is particularly adapted for eliminating large amounts of water vapor, which form as a consequence of perspiration inside the shoes of individuals who have higher-than-average perspiration.

Excessive foot perspiration can also occur in the case of extremely hot and humid climates and if the shoes are used for sports.

These documents describe a sole that has a structure comprising a supporting layer, which at least in one preset large portion is made of mesh, felt or other extensively perforated material.

A membrane made of a material that is impermeable to water and permeable to water vapor is associated in an upward region with respect to the supporting layer at least in said preset large portion made of mesh, felt or other extensively perforated material, which it covers.

A tread made of plastic material with at least one large hole that passes through the preset large portion is hermetically joined to the membrane and to the supporting layer at least at the perimeter of the large portion made of mesh, felt or other extensively perforated material.

Said sole is capable of utilizing to the fullest extent the breathability of the waterproof and water vapor-permeable membrane thanks to the presence of the large hole, which considerably increases the area for the exchange of heat and vapor of the membrane with the outside (soles with a different structure generally have, below the membrane, layers made of finely perforated plastic material, i.e., layers with mutually spaced holes having a diameter on the order of 1-2 mm; the total area of the fine perforations is much smaller, due to structural reasons, than the area of the membrane that is actually affected by the exchange of heat and vapor, limiting the breathability of said membrane).

Said sole is manufactured by "composing", by adhesive bonding, the various layers and components of the sole, which are manufactured separately: the tread, the membrane, the mid-sole, et cetera.

In this described sole type, particular attention must be given, during its manufacture, to the mechanical strength of the extensively perforated large portion made of mesh, felt or other material that is arranged below the membrane and acts as a supporting layer.

This requirement is felt particularly for soles used to provide sports shoes.

DISCLOSURE OF THE INVENTION

The aim of the present invention is to provide a waterproof and breathable sole for shoes and the related shoe that allow to utilize to the best possible extent the breathability of the membrane.

Within this aim, a consequent primary object of the present invention is to provide a waterproof and breathable sole for shoes whose structure allows to enlarge the area of the membrane until it affects substantially the entire surface of the sole, without however compromising the strength of said sole.

Another object is to provide a waterproof and breathable sole for shoes that has a high degree of adhesion of the various components of said sole.

Another object of the present invention is to provide a sole that can be manufactured with a higher degree of automation than the manufacture of known types and in which the costs are competitive with respect to the costs of known types.

This aim and these and other objects that will become better apparent hereinafter are achieved by a waterproof and breathable sole for shoes, which comprises:

a lower layer, which has at least one large through hole, a mesh, which is arranged above said lower layer, substantially so as to overlap said at least one large through hole, a membrane made of a material that is impermeable to water and permeable to water vapor and is associated in an upward region with respect to said mesh at least at said at least one large hole, said membrane being joined hermetically at least perimetrically to at least one component of said sole in such a manner as to avoid the rise of liquids through the perimeter of said large hole;

a perforated upper layer, which is arranged above said membrane;

said sole being characterized in that said lower layer is overmolded on said mesh and partially incorporates it.

BRIEF DESCRIPTION OF THE DRAWINGS

Further characteristics and advantages of the invention will become better apparent from the description of some preferred but not exclusive embodiments thereof, illustrated by way of non-limiting example in the accompanying drawings, wherein:

FIG. 7 is a plan view of the sole in the first embodiment thereof, according to the invention;

FIG. 8 is a view of a variation of the plan configuration of the sole according to the invention with respect to FIG. 7.

WAYS TO CARRYING OUT THE INVENTION

Figure 1:
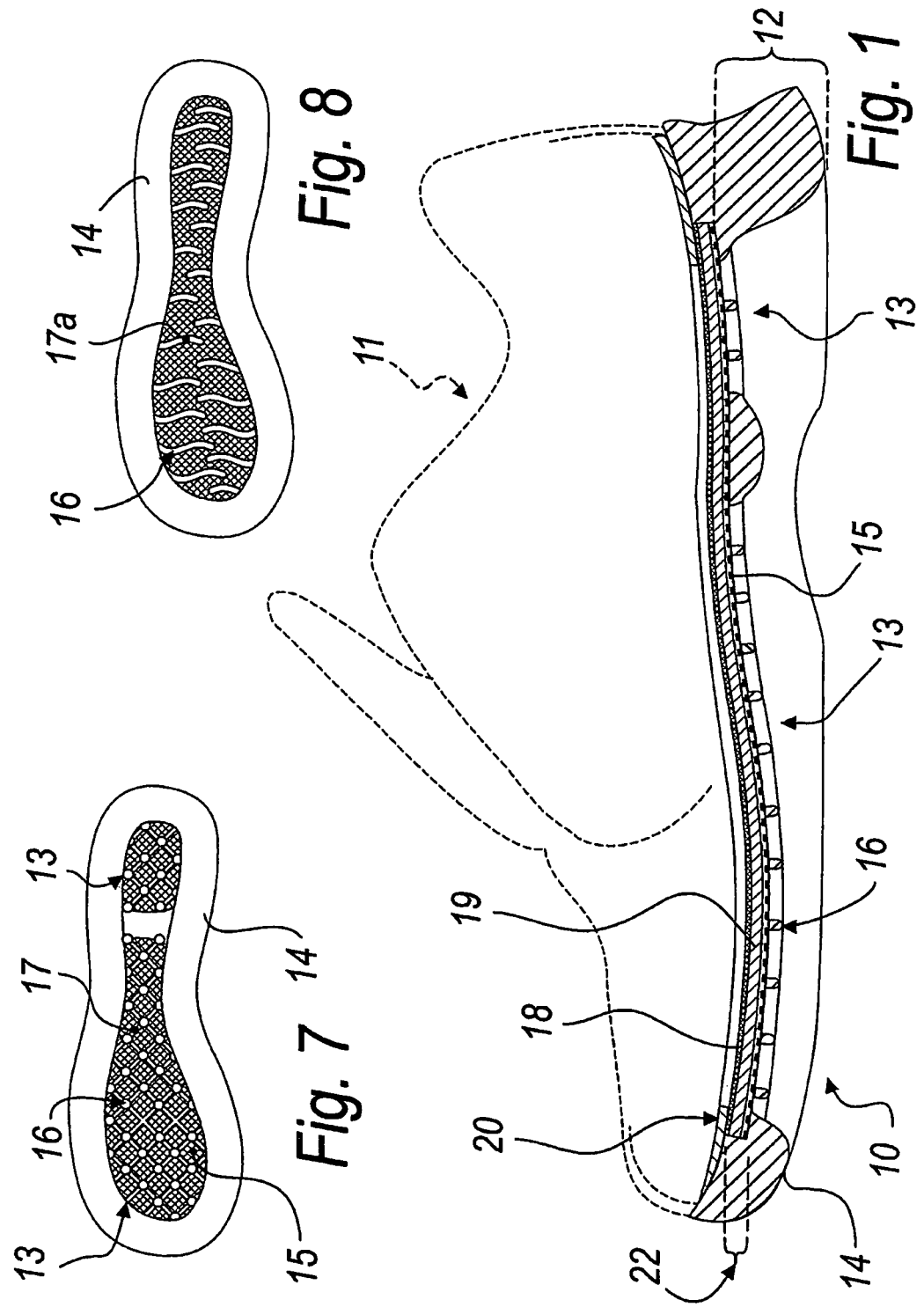
FIG. 1 is a schematic longitudinal sectional side view of a sole according to a first embodiment of the invention, showing schematically in dashed lines the corresponding shoe.
Figure 2:
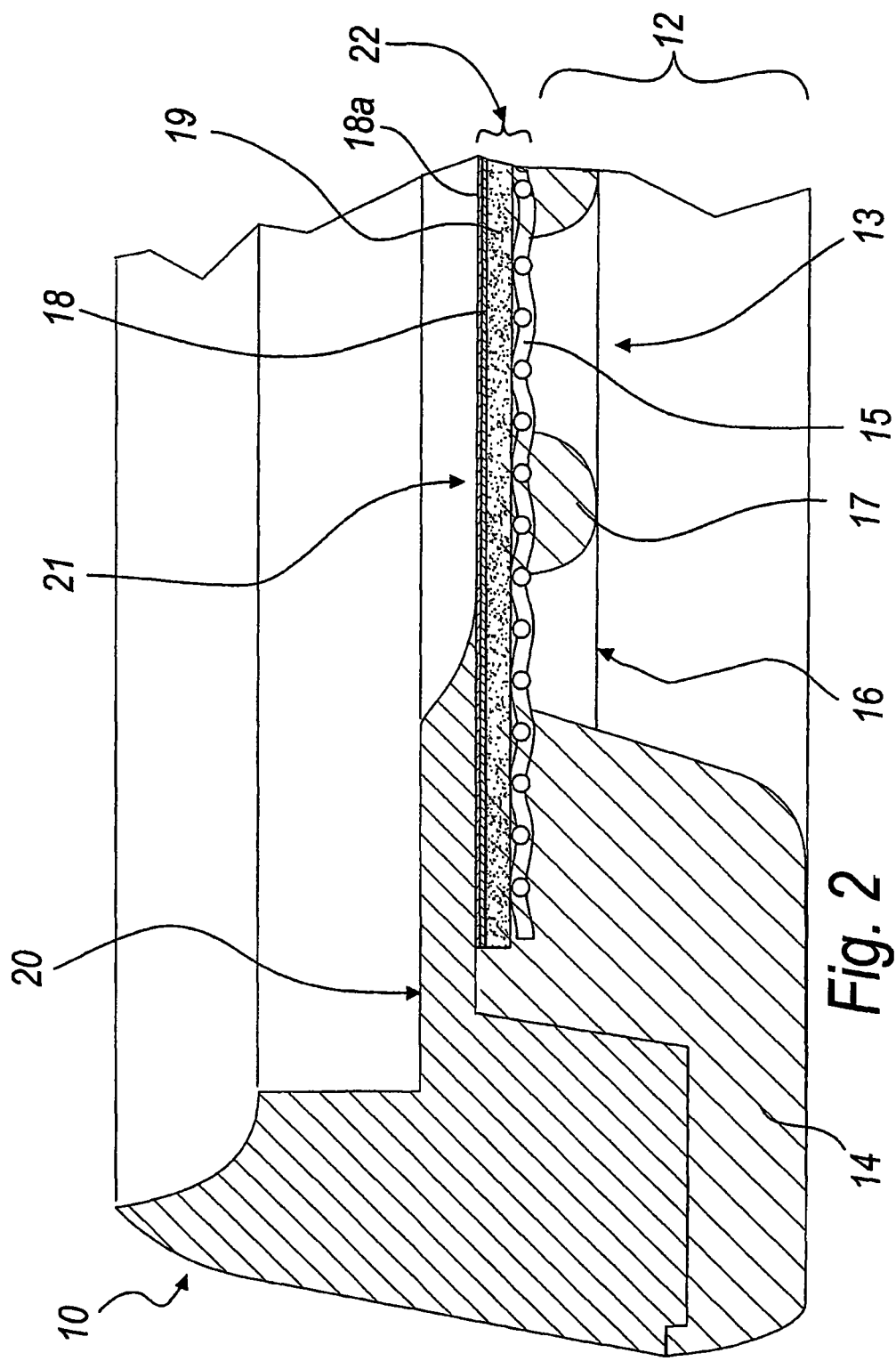
FIG. 2 is a transverse sectional view of a portion of a sole according to the invention, according to the first embodiment of FIG. 1.

With reference to FIGS. 1 and 2, a first embodiment of the sole according to the invention is generally designated by the reference numeral 10.

Said sole 10 is applied for example to a shoe, generally designated by the reference numeral 11 in FIG. 1.

Said sole 10 schematically comprises a lower layer 12, which in this embodiment has two large through holes or openings 13.

In particular, said lower layer 12 comprises a tread 14, which substantially forms the contour of said large through holes 13.

In particular, said large through holes 13 are formed on the entire forefoot and in the heel region.

A mesh 15, for example made of nylon, is arranged above said lower layer 12, so as to be substantially superimposed on both of the large through holes 13.

As shown in FIG. 7, transverse elements 16 are provided at the large through holes 13, for example so as to form a large grid 17 that is rigidly coupled to the tread 14 and to the mesh 15.

Said transverse elements 16, in the case shown in FIG. 7, are designed to avoid transverse deformations of the assembly, acting as tension elements in the deformations of the sole caused by use, and are structured so as to obstruct as little as possible the area of the large holes 13.

Above the mesh 15, at said large holes 13, there is a membrane 18 made of a material that is impermeable to water and permeable to water vapor (which is normally commercially available and is made for example of expanded polytetrafluoroethylene).

In this embodiment, the membrane 18 is preferably laminated with a supporting gauze 18a (shown in FIG. 2).

Said supporting gauze 18a may be omitted in other embodiments.

Moreover, in this embodiment, the membrane is coupled, in a known manner, to a protective element 19 (which is permeable to water vapor) that lies below it, such as for example a felt.

The coupling is for example provided by spot gluing, so as to avoid compromising the breathability of the membrane 18.

It should be noted that the protective element 19 is preferably provided when the mesh 15 is unable to protect the membrane 18 on its own.

The membrane 18 is perimetrically and hermetically joined to the rest of the sole, as described in greater detail hereinafter, so as to avoid the rise of liquids through the perimeter of the large through holes 13.

Above the membrane 18 and the tread 14 there is a perforated upper layer 20, such as for example a mid-sole, which is superimposed perimetrically on the membrane 18 and therefore has at least one additional large hole 21 at the large holes 13, so as to allow the outward breathability of the shoe.

From the technological standpoint, the sole 10 is provided as follows.

First of all, a "pack" 22 constituted by the mesh 15 and by the membrane 18 with the corresponding protective element 19 is prepared.

For example, said mesh 15 is rigidly coupled to the membrane 18 with the protective element 19 by means of a perimetric stitched seam or by perimetric or spot adhesive bonding.

Said "pack" 22 is arranged as an insert inside a mold for injection molding (not shown in the figures), which forms the tread 14 and the transverse elements 16.

Said tread 14 and the transverse elements 16 are made of plastic material, such as for example a thermoplastic polyurethane (TPU).

In practice, the lower layer 12 is overmolded on the mesh 15, incorporating it in the parts where they make contact.

The TPU in fact rises through the mesh 15, incorporating it and also penetrating the felt, which is optionally reduced in thickness and acts as a protective element 19 for the membrane 18. As an alternative, the perimetric part of the felt can be pared down in order to allow the TPU to reach the membrane 18.

In particular, the tread 14 is overmolded on the mesh 15 substantially at the perimetric peripheral region of the large holes 13.

This intermediate component, formed by the pack 22 and by the lower layer 12, is arranged in an additional mold (also not shown in the figures).

At this point, the upper layer 20 is overmolded on the tread 14 and perimetrically on the membrane 18.

Like the lower layer 12, the upper layer 20 also is preferably made of TPU.

In this manner, one obtains a hermetic coupling of the perimetric peripheral region of the membrane 18 above said membrane, below it and laterally.

The TPU in fact bonds intimately with the membrane 18, forming in practice a perimetric sealing bead.

FIG. 7 illustrates the plan configuration of the sole 10 and shows the grid 17 formed by the transverse elements 16 for strengthening said sole.

FIG. 8 illustrates a variation of said transverse elements 16, which are provided for example by cross-members, designated by the reference numeral 17a, which protrude from the lateral bead of the tread 14 and lie on the mesh 15 for a certain extent.

It is evident that alternative embodiments may provide for an assembly of the components of the "pack" 22 that is different from the one described.

For example, it is possible to arrange only the mesh 15 as a mold insert and to provide thereon the overmolding of the lower layer 12.

Subsequently, it is possible to insert the resulting intermediate component in the mold for manufacturing the upper layer 20. Here it is possible to arrange the membrane 18 on the mesh 15 and to keep it stationary thereon during the injection of TPU, by means of perimetric locking pins integrated in the mold.

It is evident that it is possible to compose the number of components of the "pack" according to requirements, for example by interposing between the membrane 18 and the mesh 15 an additional fine mesh made of Kevlar, for example in order to increase the degree of protection of said membrane.

Figure 3:
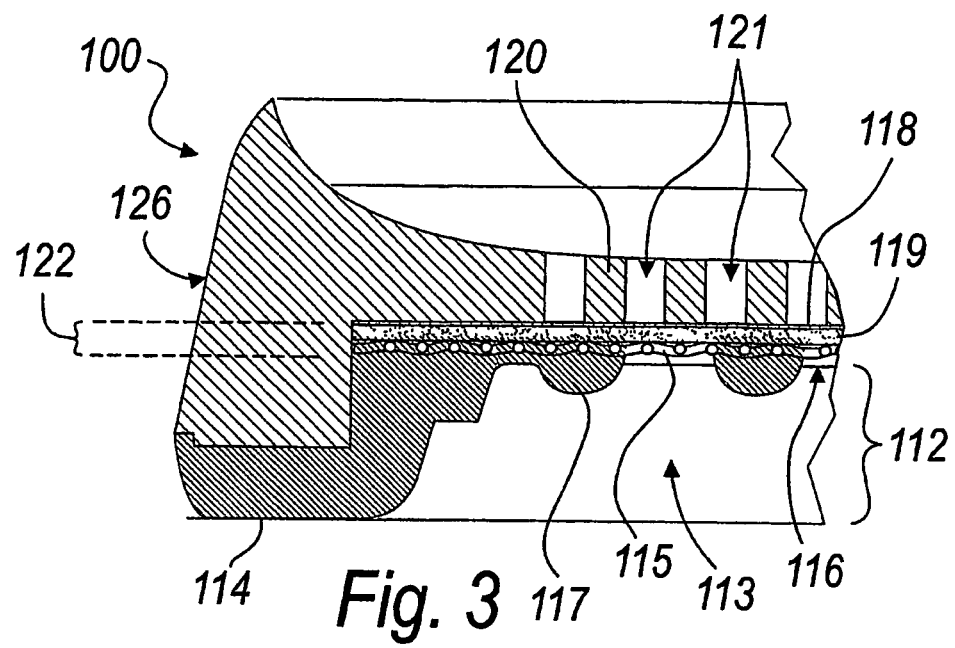
FIG. 3 is a transverse sectional view of a portion of a sole according to the invention, according to a second embodiment.

A second embodiment is shown in FIG. 3 and is generally designated by the reference numeral 100.

Said sole 100 is structurally similar to the sole 10 described earlier. Schematically, it comprises a lower layer 112, which has at least one large through hole 113.

In particular, said lower layer 112 comprises a tread 114, which substantially forms the contour of said large through hole 113.

On top of said lower layer 112 there is a mesh 115, made for example of nylon, which lies so as to substantially overlap the large through hole 113.

As in the preceding embodiment, at the large through hole 113 there are transverse elements 116, which are rigidly coupled to the tread 114 and to the mesh 115.

On top of the mesh 115, at said large hole 113, there is a membrane 118 made of a material that is impermeable to water and permeable to water vapor (which is normally commercially available and is made for example of expanded polytetrafluoroethylene).

In this embodiment, said membrane 118 is coupled to a protective element 119 (which is permeable to water vapor) that is arranged below it, such as for example a felt.

The membrane 118 is joined hermetically and perimetrically to the rest of the sole, as described more clearly hereinafter, so as to avoid the rise of liquids through the perimeter of the large through holes 113.

Above the membrane 118 and the tread 114 there is a perforated upper layer 120, such as for example a mid-sole that is superimposed on the membrane 118 and is provided with a series of holes 121 at the large hole 113, so as to allow the outward breathability of the shoe.

In particular, in this embodiment, said upper layer 120 is formed monolithically with a structural element 126, which is fixed to the lower layer 112; in particular, it is arranged above the tread 114 and surrounds the pack 122 perimetrically.

From the technological standpoint, the sole 100 is provided as follows.

First of all, as in the previous embodiment, a "pack" 122 constituted by the mesh 115 and by the membrane 118 with the corresponding protective element 119 is prepared.

Said "pack" 122 is arranged as an insert within a first mold for injection molding (not shown in the figures), which forms the tread 114 and the transverse elements 116.

Said tread 114 and the transverse elements 116 are made of plastic material, such as preferably TPU.

In practice, the lower layer 112 is overmolded on the mesh 115, incorporating it in the parts where they make contact.

The TPU in fact rises through the mesh 115, incorporating it and penetrating also inside the felt, which is optionally reduced in thickness, and acts as a protective element 119 for the membrane 118. As an alternative, the perimetric part of the felt can be pared down in order to allow the TPU to reach the membrane 118.

In particular, the tread 114 is overmolded on the mesh 115 substantially at the perimetric peripheral region of the large hole 113.

Differently from the previous embodiment, the structural element 126 is formed separately in a second mold.

Said structural element 126, which comprises monolithically also the upper layer 120, is made of a "soft" plastic material, such as preferably ethyl vinyl acetate (EVA).

The structural element 126 and the intermediate component formed by the pack 122 with the lower layer 112 are then coupled and glued according to per se known techniques.

In this case, the membrane 118 is sealed at its lower perimetric peripheral region.

The TPU of the lower layer 122 (in particular of the tread 114) in fact rises substantially up to the membrane, forming in practice, in a lower region, a perimetric sealing bead.

A further seal can be obtained for example by means of adhesive, which is distributed on the membrane 118 before it is coupled to the structural element 126, or by interposing hot-melt adhesive films or films to be subjected to high-frequency welding, by means of known manufacturing methods.

In variations, it is possible to form a TPU sealing bead also laterally and above the membrane.

Figure 4:
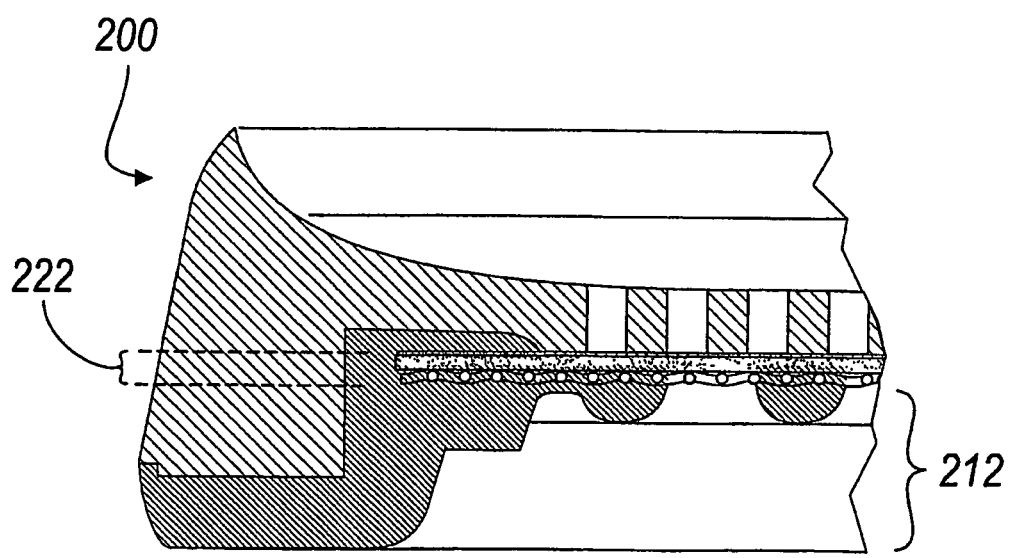
FIG. 4 is a transverse sectional view of a portion of a sole according to the invention, according to a variation of the second embodiment of FIG. 3.

In this regard, FIG. 4 illustrates a variation of said second embodiment 100, designated by the reference numeral 200.

In this case, the lower layer 212 incorporates the perimetric peripheral region of the pack 222 above and below and laterally.

Said lower layer 212 is overmolded on the pack 222, thus obtaining an optimum sealing bead on the perimetric peripheral region of said pack 222.

In manufacturing methods that are alternative to those described, it is possible to overmold the lower layer 112 only on the mesh 115 and to couple separately, for example by adhesive bonding, the membrane 118 (with the protective element 119) to the structural element 126, providing in this step a connecting seal between them according to known methods.

The structural element 126 is then coupled by adhesive bonding, with the membrane 118, to the lower layer 112 with the mesh 115.

Figure 5:
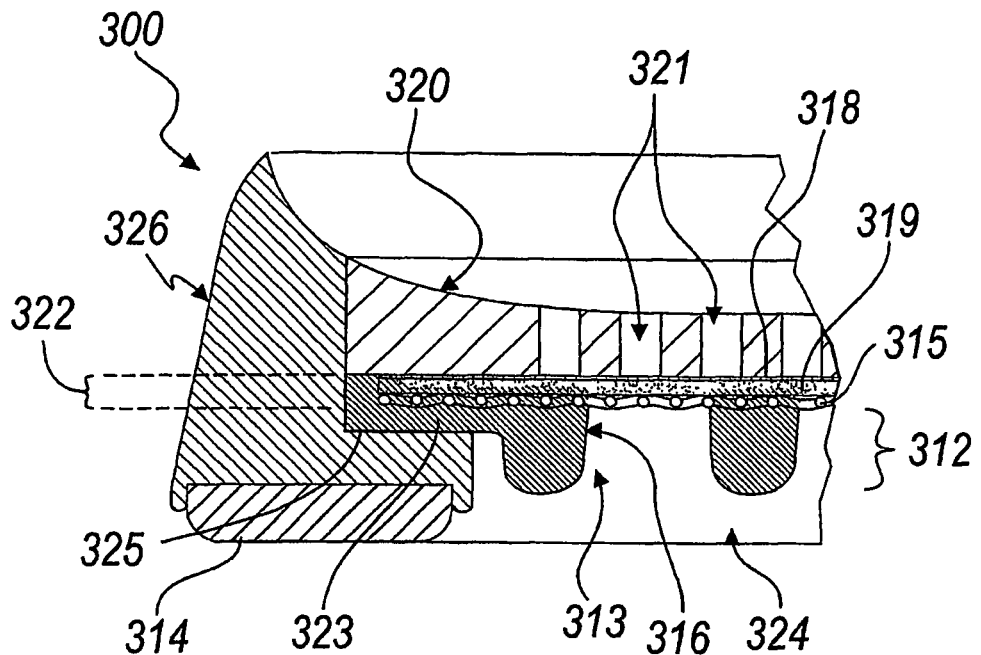
FIG. 5 is a transverse sectional view of a portion of a sole according to the invention, according to a third embodiment.
Figure 6:
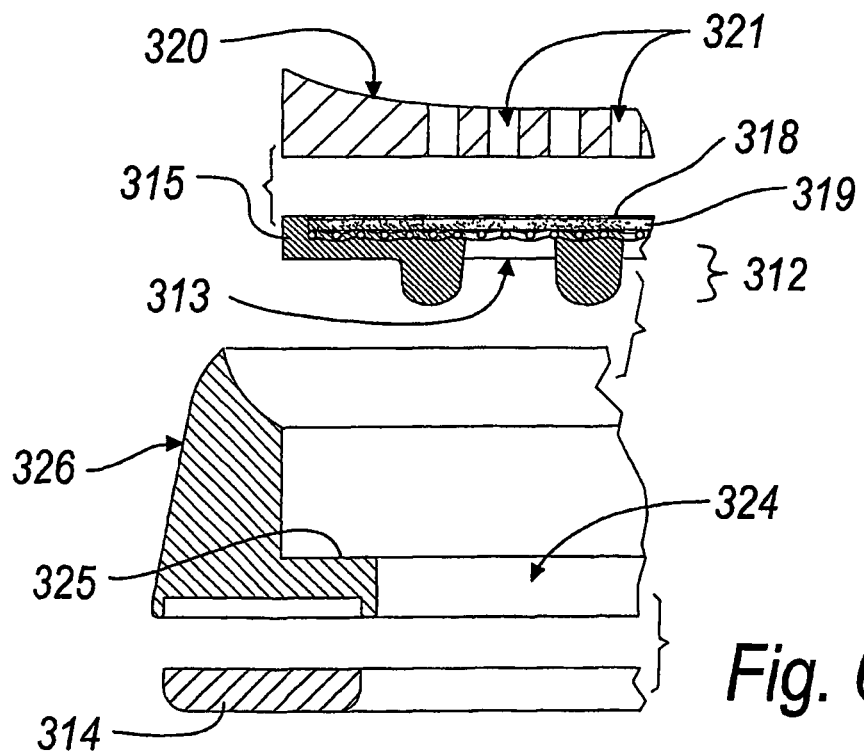
FIG. 6 is an exploded view of the sole portion of FIG. 5.

FIGS. 5 and 6 illustrate a third embodiment of the sole according to the invention, generally designated by the reference numeral 300.

In this embodiment, the lower layer 312 is constituted by a lateral bead 323, from which the transverse elements 316 protrude.

At least one large through hole 313 is formed in the lower layer 312.

A mesh 315, made for example of nylon, is arranged above said lower layer 312 and substantially lies so as to be at least superimposed on the large through hole 313.

As in the preceding embodiments, at the large through hole 313 the transverse elements 316 are provided, which are rigidly coupled to the mesh 315 and to the lateral bead 323.

Above the mesh 315, at said large hole 313, there is a membrane 318 made of a material that is impermeable to water and permeable to water vapor (which is normally commercially available and is made for example of expanded polytetrafluoroethylene).

Said membrane 318, as in the other described embodiments, is coupled to a protective element 319 (which is permeable to water vapor) which lies below it, such as for example a felt.

The membrane 318 is joined perimetrically and hermetically to the rest of the sole, as described more clearly hereinafter, so as to avoid the rise of liquids through the perimeter of the large through hole 313.

Above the membrane 318 there is an upper layer 320, such as for example a mid-sole which is superimposed on the membrane 318 and is provided with a series of holes 321 at the large hole 313, so as to allow outward breathability of the shoe.

In particular, in this embodiment said upper layer 320 is provided separately from the other components of the sole.

The sole 300 comprises a structural element 326, which is provided with a corresponding hole 324 for the large hole 313, which is also in practice a large hole.

Said structural element 326 surrounds the lower layer 312.

In particular, the lower layer 312 rests on a lower abutment 325 formed on the internal perimeter of the structural element 326.

A tread 314 is provided below the structural element 326.

From a technological standpoint, the sole 300 is provided as follows.

First of all, as in the preceding embodiments, the "pack" 322 constituted by the mesh 315 and by the membrane 318 with the corresponding protective element 319 is prepared.

Said "pack" 322 is arranged as an insert inside a first mold for injection molding (not shown in the figures), which forms the lower layer 312.

Said lower layer 312 is made of plastic material, such as preferably TPU.

In practice, the lower layer 312 is overmolded on the mesh 315, incorporating it in the parts where they make contact.

The TPU in fact rises through the mesh 315, incorporating it and also penetrating the felt, which is optionally reduced in thickness and acts as a protective element 319 for the membrane 318. As an alternative, the perimetric part of the felt can be pared down in order to allow the TPU to reach the membrane 318.

Differently from the first described embodiment, and like the second described embodiment, the structural element 326 is formed separately in a second mold, the upper layer 320 is formed separately in a third mold, and the tread 314 is formed separately in a fourth mold.

Said structural element 326 is made of a "soft" plastic material, such as preferably EVA, while the upper layer 320 is preferably made of polyurethane (PU), or also made of EVA.

The structural element 326, the upper layer 320 and the intermediate component formed by the pack 322 with the lower layer 312 are then coupled and glued by means of per se known methods (see the exploded view of FIG. 6).

The tread 314 is then glued to the structural element 326.

In this case, the membrane 318 is sealed below and laterally with respect to said membrane 318, at its perimetric peripheral region.

The TPU of the lower layer 312 in fact rises substantially up to the membrane 318, forming downwardly and laterally a perimetric sealing bead.

An additional seal can be obtained for example by means of adhesive distributed on the membrane 318 before coupling it to the upper layer 320.

In variations, it is possible to form a sealing bead made of TPU also above the membrane (not shown in the figures).

In manufacturing methods that are alternative to those described, as already mentioned for the second embodiment, it is possible to overmold the lower layer 312 only on the mesh 315 and to couple separately, for example by adhesive bonding, the membrane 318 (with the protective element 319) to the structural element 326, providing in this step, between them, according to known methods, a connecting seal.

The structural element 326 with the membrane 318 is then coupled by adhesive bonding to the lower layer 312 with the mesh 315.

It is evident that it is possible to combine, while remaining within the scope of the same inventive concept, the teachings of the three described embodiments in order to obtain additional embodiments that are useful according to the requirements of production.

In practice it has been found that the invention thus described achieves the intended aim and objects; in particular, the present invention provides a waterproof and breathable sole for shoes (and the corresponding shoe) that allows to utilize to the fullest possible extent the breathability of the membrane.

A sole with large holes adapted to allow the membrane to have excellent breathability has been in fact provided.

Moreover, it has been possible to enlarge the area of the membrane until it affects substantially or extends over the entire sole or plantar surface, without however compromising the strength of said sole.

The strength of the sole is also ensured when using sports shoes, thanks to the fact that the lower layer is overmolded on the mesh that supports and protects the membrane.

The idea of using a lower layer made of TPU overmolded onto the mesh allows to achieve mechanical strength of said mesh even by using "soft" materials such as EVA in combination.

This overmolding operation allows to obtain high degrees of adhesion of the various components of the sole and to speed up the operations for composing said sole, with a consequent cost reduction.

The invention thus conceived is susceptible of numerous modifications and variations, all of which are within the scope of the appended claims; all the details may further be replaced with other technically equivalent elements.

In practice, the materials used, so long as they are compatible with the specific use, as well as the dimensions, may be any according to requirements and to the state of the art.

The disclosures in Italian Patent Application No. PD2004A000208 from which this application claims priority are incorporated herein by reference.

The invention claimed is:

1. A waterproof and breathable sole for shoes, comprising:
a lower layer comprising a tread, said lower layer including at least one large opening formed in the tread such that the tread substantially forms an outer contour of said large opening, wherein the at least one large opening passes through the lower layer and is transversely extensive across said lower layer;
a mesh, arranged above said lower layer, substantially so as to cover a top region of said at least one large opening;
a membrane made of a material that is impermeable to water and permeable to water vapor and is associated above said mesh at least at said at least one large opening, said membrane being joined hermetically at least perimetrically to at least one component of said sole in such a manner as to avoid the rise of liquids through a perimeter of said at least one large opening; and
a perforated upper layer, arranged above said membrane,
wherein said lower layer is overmolded on and partially incorporates said mesh at least at a peripheral region of the at least one large opening,
wherein said lower layer includes transverse elements separate from the mesh and within said at least one large opening, and said transverse elements are rigidly coupled to said mesh, wherein said transverse elements form a grid and said transverse elements are rigidly coupled to the tread, and
wherein the grid is formed within the at least one large opening.

2. The sole according to claim 1, further comprising a structural element, which is perforated at least at said at least one large opening, which is provided by molding in a first mold, said lower layer being overmolded on said mesh in a second mold, said structural element being coupled to said lower layer by adhesive bonding.

3. The sole according to claim 2, wherein said tread is overmolded on said mesh substantially at a perimetric peripheral region of said at least one large opening.

4. The sole according to claim 3, wherein said perforated upper layer is formed monolithically with said structural element, which is arranged above said tread.

5. The sole according to claim 2, wherein said membrane is fixed to said perforated upper layer and is fixed to said mesh, on which said lower layer has been overmolded beforehand.

6. The sole according to claim 2, wherein said structural element is made of ethyl vinyl acetate.

7. The sole according to claim 1, wherein said membrane and said mesh form a rigidly coupled pack for insertion as an insert in a mold configured for overmolding of said lower layer on said mesh.

8. The sole according to claim 7, wherein said mesh is rigidly coupled to said membrane by a perimetric stitched seam or by adhesive bonding.

9. The sole according to claim 1, wherein said membrane is joined perimetrically and hermetically to at least said lower layer.

10. The sole according to claim 1, wherein said mesh is preferably made of nylon.

11. The sole according to claim 1, wherein said membrane is coupled to a protective element.

12. The sole according to claim 11, wherein said protective element is reduced in thickness or pared down perimetrically in order to allow the plastic material injected in a mold to reach said membrane.

13. The sole according to claim 1, wherein said lower layer is made of thermoplastic polyurethane.

14. The sole according to claim 1, wherein said tread is made of rubber.

15. A shoe comprising the sole of claim 1.

16. The sole according to claim 1, wherein the grid is formed within the at least one large opening such that a surface of the opening is crossed by the grid.

17. The sole according to claim 1, wherein the at least one large opening extends continuously from a first side of the lower layer across the lower layer to a second side of the lower layer.

* * * * *